United States Patent [19]

Kruger

[11] Patent Number: 4,892,420
[45] Date of Patent: Jan. 9, 1990

[54] FRICTION BEARING FOR DEEP WELL DRILLING TOOLS

[76] Inventor: Volker Kruger, Sassengarten 8, D-3110 Celle, Fed. Rep. of Germany

[21] Appl. No.: 172,591

[22] Filed: Mar. 24, 1988

[30] Foreign Application Priority Data

Mar. 25, 1987 [DE]  Fed. Rep. of Germany ....... 3709836

[51] Int. Cl.$^4$ .......................... F16C 33/12; E21B 4/02
[52] U.S. Cl. .................................... 384/420; 175/371; 384/284
[58] Field of Search ................... 384/92, 95, 284, 285, 384/293, 297, 420, 424, 907, 907.1, 913, 276, 42; 175/371

[56] References Cited

U.S. PATENT DOCUMENTS

| | | | |
|---|---|---|---|
| T102,901 | 4/1983 | Offenbacher | 384/907 X |
| 2,757,055 | 7/1956 | Davis | 384/293 X |
| 4,468,138 | 8/1984 | Nagel | 384/907.1 X |
| 4,555,186 | 11/1985 | Scruggs | 384/92 X |
| 4,662,384 | 5/1987 | Hall et al. | 384/907.1 X |
| 4,720,199 | 1/1988 | Geczy et al. | 384/282 |

*Primary Examiner*—Thomas R. Hannon
*Attorney, Agent, or Firm*—Arnold, White & Durkee

[57] ABSTRACT

A friction bearing suitable for use with well drilling tools which includes a trace ring with a sliding surface formed of a plurality of sintered molded bodies countersunk to be flushed with the surface of the ring, and arranged side by side in a mosaic pattern to define a ring channel with an essentially close surface. The trace ring may have molded segments of different types of molded bodies, and of different shapes.

9 Claims, 2 Drawing Sheets

FRICTION BEARING FOR DEEP WELL DRILLING TOOLS

BACKGROUND OF THE INVENTION

This invention concerns a friction bearing for deep well drilling tools, especially drill bit direct drives.

In a known friction bearing for deep well drilling tools, a trace ring is provided (US Defensive Publication T102 901) having a ring-shaped bearing body of steel and prefabricated cylindrical bodies mounted in axial boreholes of the bearing body and having a bearing layer of polycrystalline diamond and a support layer of a sintered material. The molded bodies are placed in a ring-shaped arrangement in the trace ring with their diamond layer that is provided with a conical taper projecting above the surface of the supporting body and forming a sliding plane composed of adjacent ring-shaped sliding surfaces. The bearing ring in turn has cylindrical molded bodies provided with a polycrystalline diamond layer at the surface and set in a ring as bearing segments that are supported on the sliding surface of the trace ring.

Such a design is associated with load conditions that change constantly because the surfaces that are in mutual engagement change constantly and greatly during one complete revolution. A friction bearing with such a design of the trace ring is therefore limited in its load bearing capacity and is subject to a great deal of wear.

In another known friction bearing (German Patent No. 3,513,124), the trace ring has a cohesive ring-shaped slide way in the form of a seat of a sintered metal powder ceramic material or polycrystalline diamond material. Such a trace ring can withstand high loads and operates under uniform load conditions but is expensive to manufacture because the seat cannot be prefabricated but instead can only be manufactured by sintering it as a whole onto the support body in a separate operation.

This invention is based on the goal of creating a friction bearing that can withstand high loads, is subject to little wear and can be manufactured under favorable conditions.

With the friction bearing according to this invention, the surfaces of the molded bodies form an essentially closed ring channel with the result that the contact surface between the friction bodies of the bearing ring and the ring channel of the trace ring do not undergo any mentionable changes during one revolution of the bearing. Accordingly, the friction bearing can withstand high loads and also shows little wear due to the essentially uniform load conditions. Furthermore, the mosaic-like arrangement makes it possible to use molded bodies consisting of blanks of partially worn cutting elements of rotary drill bits. This is especially the case in one version where the surfaces of the molded bodies are bordered by arc sections, because such molded bodies can be cut from circular cutting elements which are preferred in rotary drill bits and are usually worn on one side.

BRIEF DESCRIPTION OF THE DRAWINGS

Additional details and advantages derive from the following description and the figures showing schematic diagrams of two practical examples of the object of this invention. The figures show the following.

DETAILED DESCRIPTION OF A PREFERRED EMBODIMENT

Figure 2:
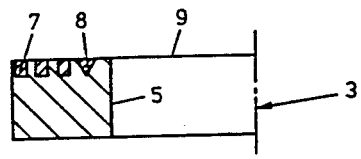
FIG. 2 shows a cross-sectional diagram of FIG. 1.
Figure 4:
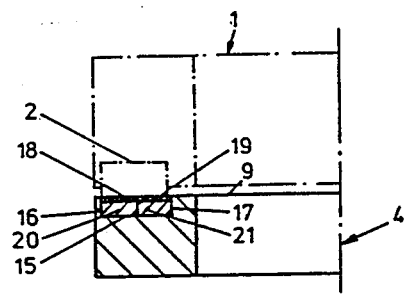
FIG. 4 shows a cross-sectional diagram to FIG. 3.
Figure 3:
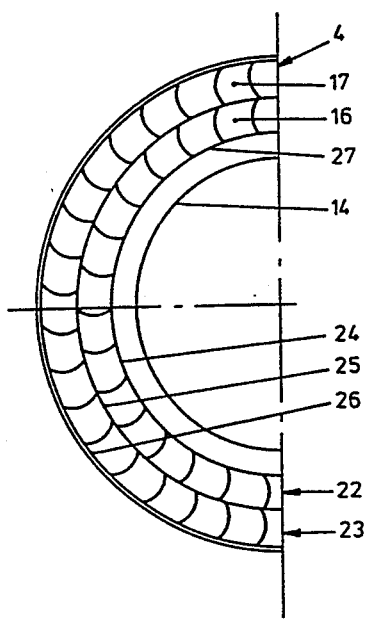
FIG. 3 shows a top view like FIG. 1 of a trace ring of a modified design.

The friction bearing for deep well drilling tools, especially drill bit direct drives, includes a bearing ring 1 which is shown with dash-dot lines in the diagram in FIG. 4 and has bearing segments 2 plus a trace ring 3 (FIGS. 1 and 2) or 4 (FIGS. 3 and 4).

Figure 1:
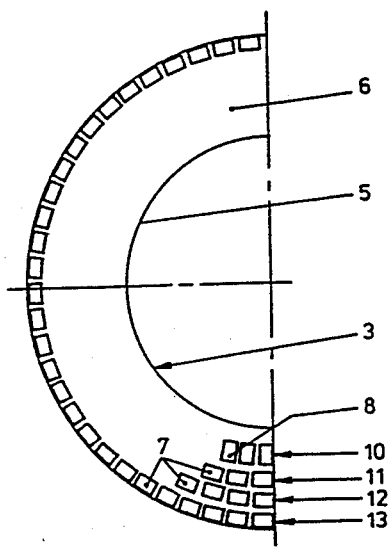
FIG. 1 shows a top view of one-half of the trace ring according to this invention.

Trace ring 3 which is illustrated in FIGS. 1 and 2 includes a generally planar ring-shaped bearing body 5 that consists of a suitable matrix, e.g., a sintered metal. The ring-shaped sliding surface 6 of trace ring 3 is formed by a number of sintered molded bodies 7, 8 in the example according to FIG. 2 that are countersunk so they are flush with the surface 9 of bearing body 5 and arranged side by side in a mosaic pattern so with their surfaces together they define a ring channel with an essentially closed surface.

Surfaces of molded bodies 7, 8 of trace ring 3 are bordered with a straight line and are arranged in several radial ring groups 10, 11, 12 and 13 with a close mutual spacing. Molded bodies 7 have a cubic shape whereas molded bodies 8 have a rod prism shape. The cubic molded bodies 7 offer a surface that is always the same as wear advances, whereas the surface becomes smaller with progressive wear in the case of molded bodies 8.

With regard to the diagrams in FIGS. 1 and 2, it should be pointed out that only a few molded bodies 7 and 8 are shown in ring groups 10, 11 and 12. However, it is self-evident that ring groups 10, 11 and 12, like ring group 13, form a closed ring of molded bodies 7 and 8.

In the version according to FIGS. 3 and 4, the bearing body 14 which is likewise ring shaped is made of steel. This is provided with a ring groove 15 at its surface 9 with molded bodies 16, 17 arranged in it. Molded bodies 16, 17 have a layer 18 or 19 of polycrystalline diamond material at their surface and they include a supporting part 20, 21 which is made of a sintered material, e.g., tungsten carbide. These molded bodies 16, 17 have their surfaces flush with surface 9 of bearing body 14 and are secured by soldering in ring groove 15.

The surfaces of molded bodies 16, 17 are bordered by arc segment lines and abut seamlessly. Here again, molded bodies 16, 17 abut with radially adjacent ring groups 22, 23 where the molded bodies 16 or 17 provided with one ring group 22 or 23 have the same radial inner and outer bordering lines supplementing each other so each forms a common arc 24, 25 or 26.

The bordering lines of molded bodies 16, 17 of each ring group 22 and 23 as seen in the circumferential direction are formed by identical arc segment lines with a small radius of curvature so the approximately sickle-shaped molded bodies 16 and 17 are alternately intermeshed relatively far into each other in the circumferential direction. This design creates an especially stable load bearing assembly with a sliding face 27 which defines a completely closed ring channel.

What is claimed is:

1. Friction bearing for well drilling tools, with a trace ring and a bearing ring where the bearing ring has bearing segments supported on the sliding face of said trace ring and the trace ring has a bearing body with a bearing material that is hard and wear resistant, characterized by the fact that the sliding face of the trace ring is formed by a number of molded bodies countersunk so flush with the surface of the bearing body and they are arranged side by side in a mosaic pattern, with their surfaces together defining a ring path that has an essentially closed surface.

2. Friction bearing according to claim 1, characterized by the fact that the surfaces of the molded bodies have a linear border and are arranged with a close mutual spacing in several radial ring groups.

3. Friction bearing according to claim 1, characterized by the fact that the surfaces of the molded bodies are bordered by arc segment lines and abut seamlessly.

4. Friction bearing according to claim 3, characterized by the fact that the molded bodies are joined together to form radially adjacent ring groups where the molded bodies provided for one ring group have mutually identical radially interior bordering lines and radially exterior bordering lines which supplement each other to form a common arc.

5. Friction bearing according to claim 4, characterized by the fact that the bordering lines of the molded bodies of each ring group that form the border as seen in the circumferential direction are formed by equal arc segment lines with a small radius of curvature.

6. Friction bearing according to one of claims 1 to 5, characterized by the fact that the molded bodies are made of a material selected from the group of hard metal, ceramic and polycrystalline diamond material.

7. Friction bearing according to claim 6, characterized by the fact that the molded bodies are made of a polycrystalline diamond material and are sintered into a matrix of sintered material forming a component of the trace ring 8. Friction bearing according to claim 6, characterized by the fact that the molded bodies have a layer of polycrystalline diamond material at their surface applied to a supporting part of the sintered material, and the molded bodies are soldered into a ring groove in the top side of the trace ring.

9. Friction bearing according to claim 1, wherein said sliding face of said trace ring is generally planar.

* * * * *

UNITED STATES PATENT AND TRADEMARK OFFICE
CERTIFICATE OF CORRECTION

PATENT NO. : 4,892,420

DATED : January 9, 1990

INVENTOR(S) : Volker Kruger

It is certified that error appears in the above-identified patent and that said Letters Patent is hereby corrected as shown below:

In column 4, line 11, please delete "of sintered material".

Signed and Sealed this

Twenty-fifth Day of December, 1990

Attest:

HARRY F. MANBECK, JR.

Attesting Officer

Commissioner of Patents and Trademarks